United States Patent
Lee et al.

(10) Patent No.: US 10,928,992 B2
(45) Date of Patent: Feb. 23, 2021

(54) HTML EDITING OPERATIONS

(71) Applicant: INTERNATIONAL BUSINESS MACHINES CORPORATION, Armonk, NY (US)

(72) Inventors: Eunjin Lee, Eastleigh (GB); John Jesse Wood, St Albans (GB); Daniel Thomas Cunnington, Winchester (GB); Giacomo Giuseppe Chiarella, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/298,376

(22) Filed: Mar. 11, 2019

(65) Prior Publication Data

US 2020/0293164 A1    Sep. 17, 2020

(51) Int. Cl.
  *G06F 3/048* (2013.01)
  *G06F 3/0484* (2013.01)

(52) U.S. Cl.
  CPC ................... *G06F 3/0484* (2013.01)

(58) Field of Classification Search
  CPC .................................................. G06F 3/0484
  See application file for complete search history.

(56) References Cited

U.S. PATENT DOCUMENTS

| 9,606,716 | B2 | 3/2017 | Sharifi |
| 9,792,272 | B2* | 10/2017 | Hicks ................. G06F 3/04883 |
| 9,886,430 | B2 | 2/2018 | Patten |
| 2009/0119679 | A1* | 5/2009 | Dowlan ................. H04L 63/08 |
| | | | 719/313 |
| 2011/0126092 | A1 | 5/2011 | Harris |
| 2012/0236040 | A1* | 9/2012 | Eom ..................... G09G 3/007 |
| | | | 345/681 |

(Continued)

FOREIGN PATENT DOCUMENTS

CN   105808258 A   7/2016

OTHER PUBLICATIONS

Chen, et al., "Bezelcopy: An Efficient Cross-Application Copy-Paste Technique for Touchscreen Smartphones", AVI '14, May 27-30, 2014, Como, Italy, https://dl.acm.org/citation.cfm?d=2598162, p. 1-8.

(Continued)

*Primary Examiner* — David E Choi
(74) *Attorney, Agent, or Firm* — Kenneth Han

(57) ABSTRACT

Methods, systems and computer program products are provided for html editing operation. The embodiment may include monitoring on a display of a device to detect an input box to receive input data of an expected data type and format. The embodiment may also include, in response to detecting an input box displayed in a first view, determining the expected data type and format of input data for the input box. The embodiment may further include analysing data displayed in a second view to identify data matching the expected data type and format of input data for the input box, wherein the second view is displayed subsequent to the first view. The embodiment may also include automatically selecting the identified data for copying from the second view to the input box in the first view as part of a copy and paste operation of the device.

20 Claims, 9 Drawing Sheets

(56) References Cited

U.S. PATENT DOCUMENTS

| | | | |
|---|---|---|---|
| 2013/0290889 A1* | 10/2013 | Bao | G06F 3/0486 715/770 |
| 2013/0298066 A1* | 11/2013 | Kim | G06F 3/0233 715/773 |
| 2014/0052725 A1* | 2/2014 | Lee | G06F 16/24 707/736 |
| 2014/0207862 A1* | 7/2014 | Domke | H04L 65/403 709/204 |
| 2014/0207874 A1* | 7/2014 | Soorianarayanan | H04L 65/403 709/206 |
| 2014/0207875 A1* | 7/2014 | Messinger | H04W 4/38 709/206 |
| 2014/0208159 A1* | 7/2014 | Soorianarayanan | G06Q 10/06 714/27 |
| 2014/0208163 A1* | 7/2014 | Domke | G06F 11/0751 714/37 |
| 2015/0339285 A1* | 11/2015 | Safaei | H04L 51/18 715/256 |
| 2018/0300351 A1* | 10/2018 | Glover | H04L 67/42 |
| 2020/0167068 A1* | 5/2020 | Tao | G06F 3/048 |

OTHER PUBLICATIONS

Green, "Help users checkout faster with Autofill", Google Developers, https://developers.google.com/web/updates/2015/06/checkout-faster-with-autofill, accessed Mar. 5, 2019, pp. 1-6.

Ives, et al., "Interactive Data Integration Through Smart Copy & Paste" http://talukdar.net/papers/cidr.pdf, Copyright 2008 ACM, 10 pages.

Mell et al., "The NIST Definition of Cloud Computing", Recommendations of the National Institute of Standards and Technology, Special Publication 800-145, Sep. 2011, 7 pages.

Stylos et al., "Citrine: Providing Intelligent Copy-and-Paste" UIST '04, Oct. 24-27, 2004, Santa Fe, New Mexico, USA, pp. 1-4.

* cited by examiner

HTML EDITING OPERATIONS

BACKGROUND

The present disclosure relates to HTML editing operations.

SUMMARY

According to an aspect of the present disclosure, a computer implemented method is provided. User navigation of views on a display of a device is monitored to detect an input box to receive input data of an expected data type and format. In response to detecting an input box displayed in a first view, the expected data type and format of input data for the input box is determined. Data displayed in a second view is analyzed to identify data matching the expected data type and format of input data for the input box in the first view, wherein the second view is displayed subsequent to the first view. In response to identifying data in the second view matching the expected data type and format of input data for the input box in the first view, the identified data is automatically selected for copying from the second view to the input box in the first view as part of a copy and paste operation of the device.

According to another aspect of the present disclosure, a device is provided. The device comprises a processor, data storage and a display. The processor is configured to monitor, on the display, user navigation of views to detect an input box to receive input data of an expected data type and format. In response to detecting an input box displayed in a first view, the processor is configured to determine the expected data type and format of input data for the input box. The processor is further configured to analyze data displayed in a second view, to identify data matching the expected data type and format of input data for the input box in the first view, wherein the second view is displayed subsequent to the first view. In response to identifying data in the second view matching the expected data type and format of input data for the input box in the first view, the processor is configured to automatically select the identified data for copying from the second view to the input box in the first view as part of a copy and paste operation of the device.

According to yet another aspect of the present disclosure, a computer program product is provided. The computer program product comprises a computer readable storage medium having program instructions embodied therewith. The program instructions are executable by a processor to cause the processor to: monitor, on a display of a device, user navigation of views to detect an input box to receive input data of an expected data type and format; determine the expected data type and format of input data for the input box, in response to detecting an input box displayed in a first view; analyze data displayed in a second view, to identify data matching the expected data type and format of input data for the input box in the first view, wherein the second view is displayed subsequent to the first view, and automatically select the identified data for copying from the second view to the input box in the first view as part of a copy and paste operation of the device, in response to identifying data in the second view matching the expected data type and format of input data for the input box in the first view.

BRIEF DESCRIPTION OF THE SEVERAL VIEWS OF THE DRAWINGS

Example implementations of the present disclosure will be described below with reference to the following drawings, in which:

FIGS. 3A-3E are schematic screenshots showing an example copy and paste operation using the method of FIG. 2;

DETAILED DESCRIPTION

Figure 1:
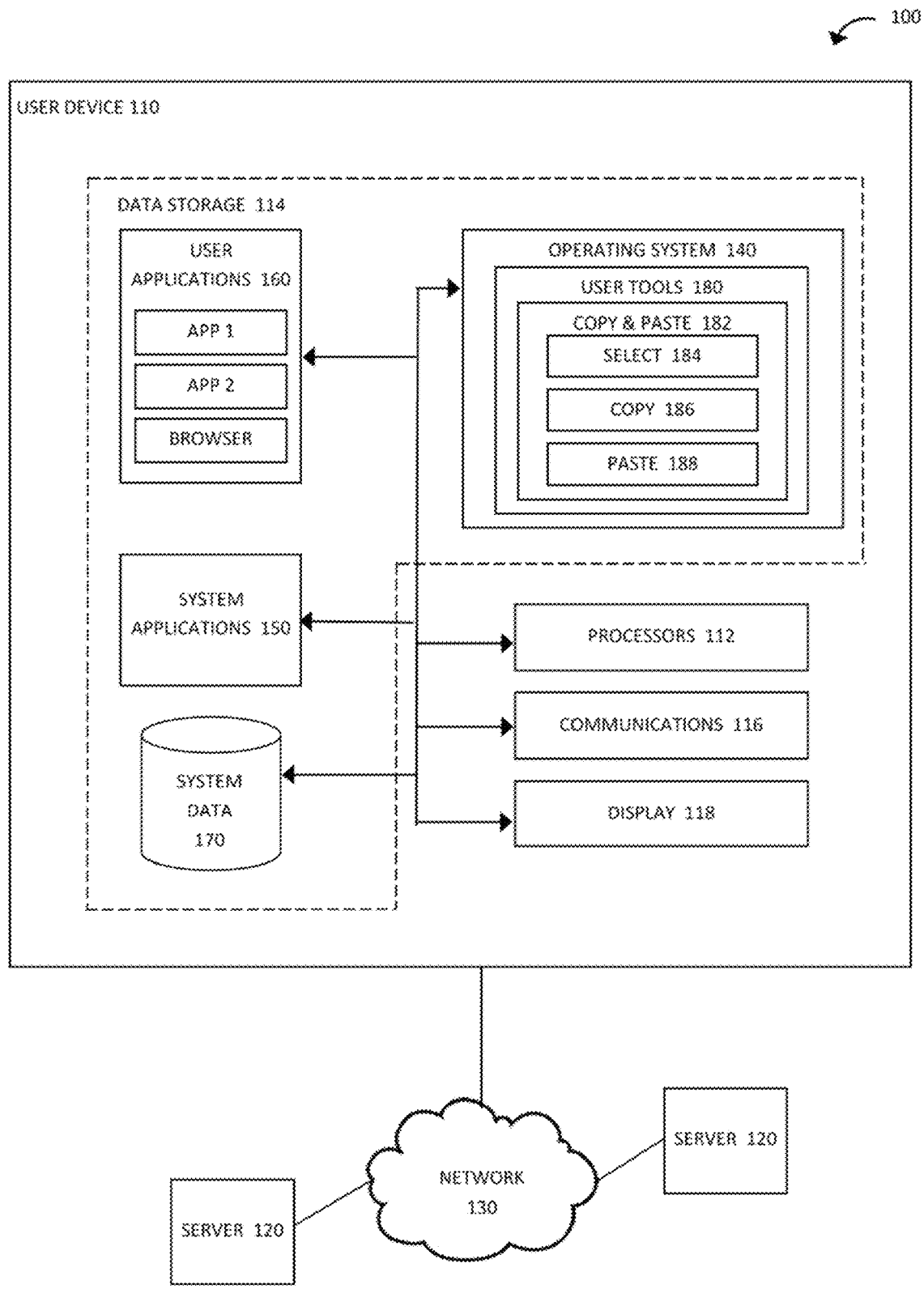
FIG. 1 is a schematic view of example system including a device in accordance with the present disclosure.

User computing devices, such as desktops, laptops, smart phones and tablets, typically provide a user copy and paste function for a user to perform a copy and paste operation. When performing a copy and paste operation, the user selects a portion of displayed data (e.g., text or similar displayed content) from a view on the display of the device and copies the selected data over into a part of another view. Accordingly, the copy and paste operation enables the user to share and utilize the same data for different purposes and tasks, without the need to reenter the data each time, thereby saving the user time and effort.

A copy and paste operation involves multiple user actions (e.g., gestures on a touchscreen or operations of an input device such as a mouse). For example, a typical copy and paste operation for a touchscreen device is performed as follows:

(i) The user performs a selection gesture (such as a "touch and hold" or "tap" gesture) on a touchscreen displaying a view with the data to be copied, to initiate a selection of data for the copy and paste operation. The touchscreen senses the location of the gesture and the system highlights a "default selection" of data associated with the sensed location. The amount of data (e.g., number of characters), and its position relative to the location of the gesture, is predefined for the default selection, as discussed further below.

(ii) The user optionally performs gestures to control a displayed selection refinement tool to manually refine the highlighted data to select the precise data to be copied. The system highlights the manually "refined selection".

(iii) The user performs a copy gesture (such as a "touch" gesture on a copy icon on the display). The system copies the selected data to a clipboard (e.g., to cache memory).

(iv) The user navigates to the view displaying the location for pasting the copied data.

(v) The user performs a pointing gesture (such as a "touch and hold" or "tap" gesture) to select a location in the view for pasting the copied data. The system highlights the location to the user (such as by displaying a cursor).

(vi) The user performs a paste gesture (such as a "touch" gesture on a paste icon on the menu bar). The system pastes the selected data from the clipboard to the selected location.

As the skilled person will appreciate, when a copy and paste operation is performed by a user with an input device other than a touchscreen, the above described "gestures" in steps (i) to (vi) are instead performed by means of user actions such as "click" and "double click", keyboard shortcut or voice-controlled operations and the like, as well known in the art.

The predefined "default selection" of data to be copied in step (i) is identified from the code for the displayed view associated with the selected location. In some implementations, the default selection is defined as the string of characters positioned between special characters (such as "l" and "–") that includes the character at the location of the user gesture. However, the default selection is frequently inefficient. For instance, in some cases, the data to be selected may itself include special characters, so that only part of the desired data will be selected by default. For example, the desired data may be a telephone number displayed as "020-123-4567". In this case, if the user gesture is at the location of the character "3" the default selection will be 123", which is only part of the telephone number. In other implementations, the default selection is defined as a text string of characters positioned between spaces, so that a single word is selected by default. However, the user may wish to select one or more sentences of text rather than a single word of text. Accordingly, the user frequently has to use the selection refinement tool and/or additional user gestures to manually refine the automatic default selection. However, a selection refinement tool is awkward to use, and additional gestures are time consuming, which is inconvenient to the user.

One common use of the copy and paste operation is to copy data from a first view on the screen into an "input box" when completing a form in a second view, for instance in a mobile or web browser or a mobile or web application, where the completed form is to be saved or sent to another device (e.g., server). For example, a web page shown in a browser may include an input box as part of an HTML form to be completed by the user as a "registration" or "sign in" screen to be sent to a server. Such an input box is associated with an expected type and format of data to be input by the user. The expected type and format of input data for an input box is specified by data (herein referred to as "element data") in the HTML code associated with the input box. In particular, the element data for an input box may include HTML input attributes that define expected input data type (e.g., text, number, email, telephone number, URL) and input/format restrictions (e.g., max/min character length). However, as described above, the default selection of data in the first view may not be consistent with the expected data type and format for a particular input box in the second view.

The present disclosure concerns the "smart selection" of data displayed in a view on the display of a device for copying, in order to provide a more efficient and user-friendly technique for a user to utilize a copy and paste operation to input data into an input box in another view of the device.

The present disclosure provides methods, systems and computer program products for improved selection of data for a copy and paste operation. In particular, whilst navigating views on the display screen of a device, a user may interact with a view having an input box for receiving input data. The user may wish to complete the input box using a copy and paste operation instead of directly inserting data into the input box using a keyboard or the like. Example implementations of the present disclosure facilitate the copy and paste operation by automatically selecting, from a subsequently displayed view with which the user interacts, data of the expected type and format for the input box. Thus, when a user navigates between different view on the display screen of a device to perform a copy and paste operation in order to complete an input box, data of the expected type and format is automatically selected as part of a "smart selection" function.

In the following description, the term "view" refers to an instance of a graphical user interface or screen actively shown on the display of a device. For example, a view may be a page, document, tab, frame, window or the like of a mobile/web browser, mobile/web application or system level application or the like of the device. The term "input box" refers to a view displayed on a device for receiving input data. Typically, the input data is input by the user for storage and/or transmission over a network. For example, an input box may be an HTML form of a view (e.g., webpage or other user interface) displayed in a mobile/web browser or other mobile/web application of a device. However, the other types of input box are possible and contemplated by the present disclosure. Unless otherwise specified, references to the selection of "data" include selection of content (e.g., text) displayed in a view (e.g., by highlighting in the view) and the selection of corresponding data stored in memory.

FIG. 1 shows an example system in accordance with the present disclosure. In particular, system 100 includes a user device 110 configured for data communication with servers 120 over a network 130. For example, device 110 may be a smart phone, tablet, laptop or similar portable computing device. Alternatively, device 110 may be a desktop computer or similar non-portable computing device. Servers 120 may be web servers, app servers, SMS servers or any other type of server for data communication to and from device 110.

User device 110 comprises one or more processors 112 for processing data, a data storage 114 for storing data, a communications unit 114 for the communication of data to and from servers 120 over network 130 and a display 118. Other features of device 110, such as a power source, camera, accelerometer, are omitted for ease of understanding of the present disclosure.

Data storage 114 stores data and program instructions for processing by processors 112 for operation of the device 110. These include operating system 140, system applications 150 and user applications 160, as well known in the art. In addition, data storage 114 may store system data 170 such as device data, user data and the like.

Display 118 provides a user interface for displaying content in the form of "views" to the user. In some example implementation, display 118 comprises a touchscreen. As well known in the art, a touchscreen enables a user to control the device 110 by means of gestures that contact, and are sensed by, the touchscreen. These include gestures that interact with a displayed graphical user interface (e.g., menu bar, icons, keyboard etc.) to allow the user to input data and commands into the device. In other example implementations, a user may control the device 110 by means of other user input devices such as a mouse or touchpad, as well known in the art.

User device 110 includes user tools 180, which provide user functions and operations to assist user control and input of data. In particular, user tools 180 include a copy and paste function 182 comprising select function 184, copy function 86 and paste function 188. Copy and paste function 182 enables a user to perform a copy and paste operation, comprising copying selected content from one view and pasting it into another view, as described above. In the illustrated implementation, the copy and paste function 182 is provided within the operating system 140, and, as such, is available to the user irrespective of the application (e.g., mobile or web application/browser or system application) displaying the user view. In other implementations, the copy and paste function 182 may be provided as part of one or more system applications 150 or one or more user applications 160. Select function 184 implements a predefined default selection of data for a view based on the location of a user gesture that initiates a selection of data for the copy and paste operation (herein also referred to as a "selection trigger"), as described above.

Aspects of the present disclosure improve the copy and paste function 182 of the device 110 of FIG. 1. In particular, aspects of the present disclosure provide a "smart selection" of data, as an extension of the "default selection" of data by select function 184 of FIG. 1, as described further below.

Figure 2:
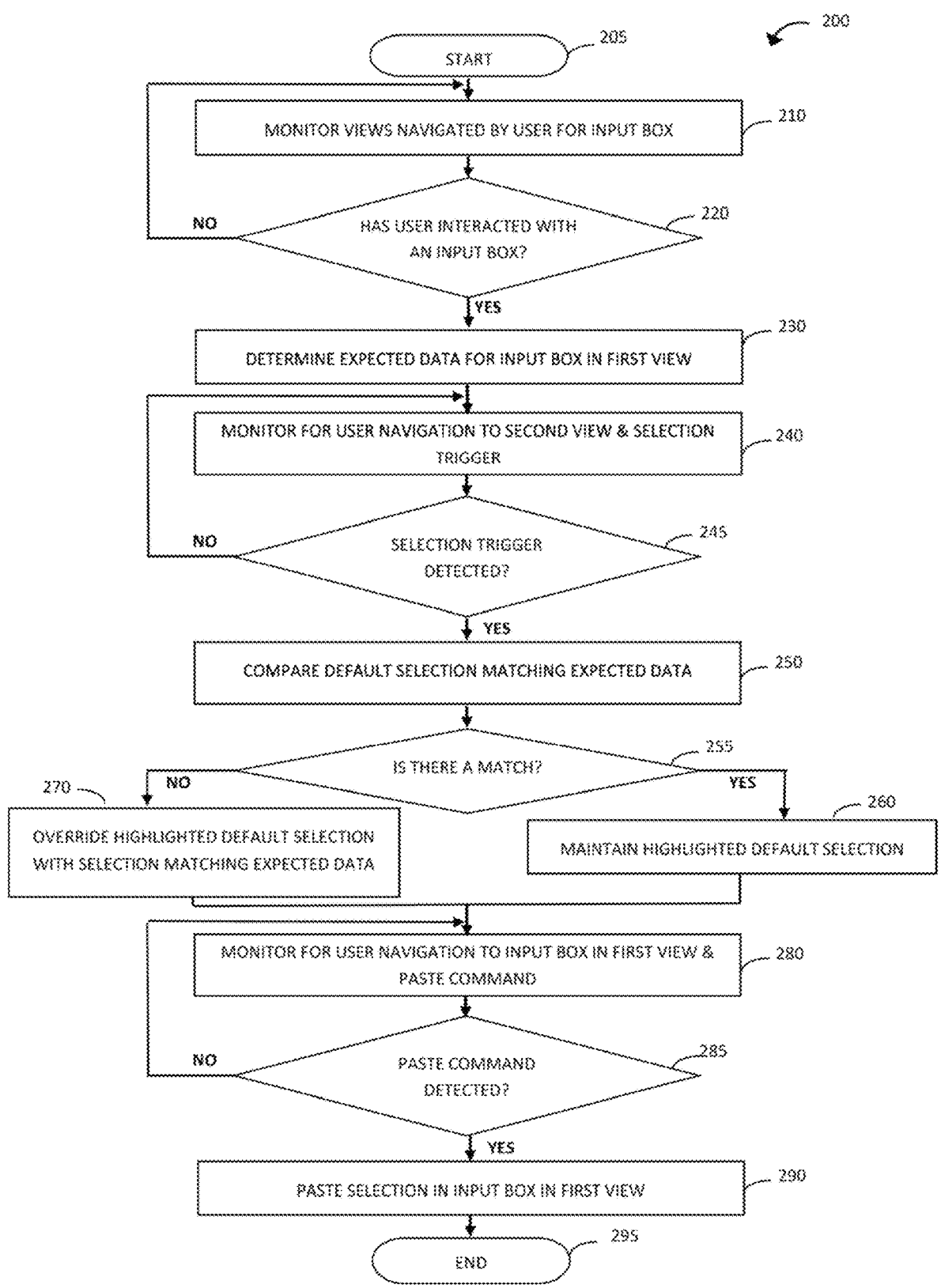
FIG. 2 is a flowchart of a method for a copy and paste operation in accordance with an example implementation of the present disclosure.

FIG. 2 is a flowchart of a method 200 for a copy and paste operation in accordance with an example implementation of the present disclosure. In particular, the method 200 provides a "smart selection" of data, which may be used in addition to the above described "default selection" of data, for completing an input box in a view of a user device.

The method 200 starts at step 205. For example, the method 200 may start when a user switches on a device or launches certain system or user applications.

At step 210, the method monitors views navigated by the user for an input box. In particular, step 210 examines the code associated with views of system and user applications displayed to the user for an input box, such as an HTML form. In the illustrated example implementation, step 210 is performed continuously to locate input boxes, and thus concurrently with the subsequent steps of the method 200, as described below.

Step 220 determines whether the user has interacted with an input box in a displayed (herein "first") view. Step 220 may be performed periodically or in response to the identification of an input box at step 210. Step 220 may determine that the user has interacted with an input box in response to a user gesture (e.g., "tap" gesture) or equivalent user action (e.g., "hover" or "mouseover" action) associated with the input box. Alternatively, step 220 may infer that the user has interacted with an input box based on the amount of time that the input box is displayed to the user. Thus, for example, user interaction with an input box may be inferred if the user pauses for a predetermined amount of time to display the input box at the center of the view rather than scrolling past the input box without pausing. If step 220 determines that the user has interacted with an input box, the method proceeds to step 230. Otherwise, the method returns to step 210.

Figure 2A:
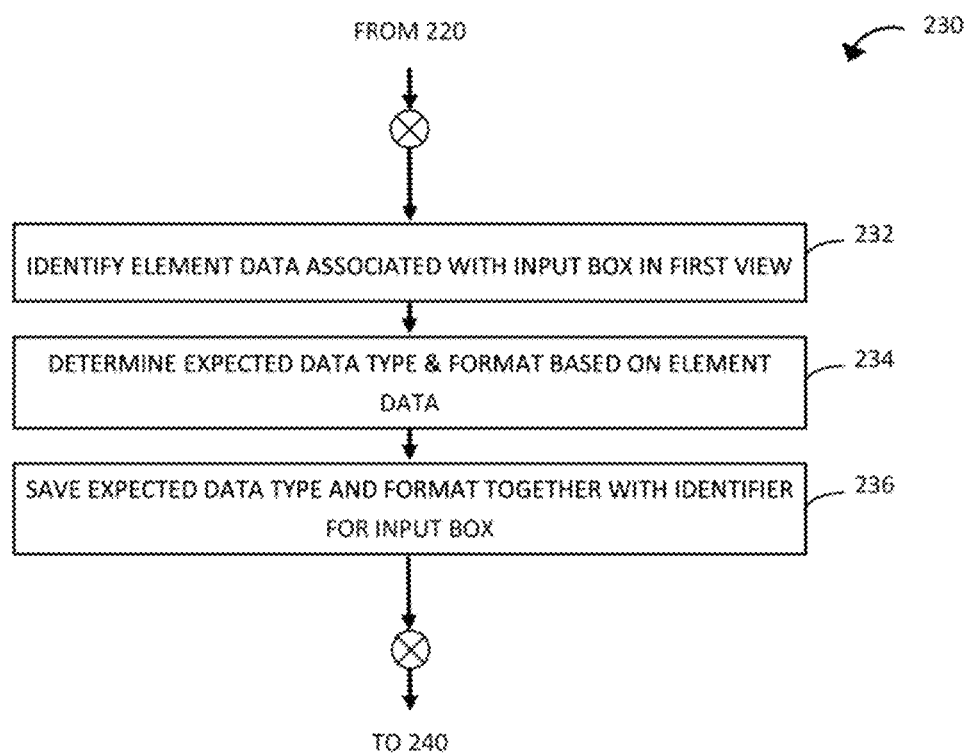
FIG. 2A is a flowchart of a method for determining expected data for an input box in accordance with example implementations of the present disclosure.

Step 230 determines the expected data for the input box in the first view. In the example implementation of the method 200 of FIG. 2, step 230 comprises a series of sub-steps 232 to 236 as shown in FIG. 2A, which together determine and save information relating to the expected type and format of input data for the input box. As the skilled person will appreciate, other techniques for determining the expected data for the input box in step 230 are possible and contemplated by the present disclosure.

In particular, referring to FIG. 2A, at step 232, the method identifies element data associated with the detected input box. For example, step 232 analyzes the code associated with the input box to identify defined data relating to the expected data to be input, such as the type of data and its format. Element data, such as attributes, parameters, values, requirements and restrictions, may include: input label name, input field tag name and autocomplete tag; input type attributes that specify input data type (which may include format), such as text, number, email, tel, and url, and other data that specify input data restrictions, such as max/min character length. Other types of data relating to the expected data to be input in an input box, which may be identified as element data, will be apparent to the skilled person.

At step 234, the method determines the expected data type and format of input data for the input box based on the element data identified in step 232. At step 236, the method saves the determines expected data type and format of input data for the input box, together with an identifier of the input box. In particular, an identifier for the input box may be generated at either step 220 or 230, for example, based on an index number of the first view, which may be saved in step 234. Typically, step 236 saves the data in memory, such as cache memory, which automatically overwrites and/or deletes data based on its age, prior consumption or other factors that determine whether continued storage of the data is required. The method then proceeds to step 240.

Returning to FIG. 2, as the user navigates to a second view (by navigating views by concurrent step 210), step 240 monitors for a selection trigger to initiate a selection for a copy and paste operation. As described previously, a selection trigger is typically a predefined gesture, such as a "touch and hold" gesture, a "tap" gesture or a predefined user action, such as a "click" action, that leads to a default selection of data based on the location of the gesture or action in the view (e.g., data between special characters) as described above. Typically, the default selection is highlighted in the second view displayed to the user.

Step 245 determines whether a selection trigger is detected. If a selection trigger is detected, the method proceeds to step 250. Otherwise, the method returns to step 240 and continues to monitor for a selection trigger.

At step 250, the method compares the default selection in response to the selection trigger with the expected data for the input box, as determined in step 230. In particular, the default selection may be compared with the expected type and format of input data for the input box, as determined in step 234. At step 255, the method determines whether the data for the default selection matches the expected data for the input box. For example, step 255 compares the data corresponding to the default selection to each of the element data attributes, values, parameters, requirements and restrictions for the expected data, to determine whether the data conforms to the expected data type and format. If step 255 determines that the default selection matches the expected data for the input box, the method proceeds to step 260.

Step 260 maintains the default selection in response to the selection trigger as the selected data for a subsequent copy and paste operation. Accordingly, when the selected default data matches the expected data, and, in particular, conforms to the expected data type and format of input data for the input box, no refinement of the selection by the user is required. The method may then wait for a copy command, for example by a user gesture or action on a copy icon, to copy the default selection to a clipboard (not shown) or may automatically copy the selection (not shown). The method then proceeds to step 280.

If step 255 determines that the default selection does not match the expected data, the method proceeds to step 270. In particular, in accordance with conventional techniques, refinement of the selection by the user would be required so that the selected data matches the expected data for the input box. In accordance with the illustrated example implementation, step 270 automatically overrides the default selection in response to the selection trigger with a selection that corresponds to the expected data for the input box. In particular, step 270 identifies data in the second view that matches the expected data for the input box.

In most scenarios, the user gesture or action indicates the general location of the desired data, which that matches the expected data, and so step 270 merely considers and analyzes the code for displayed data (e.g., text) in the vicinity of the data displayed at the location of the user gesture for a match. In this case, various techniques may be used to identify matching data. For example, step 270 may analyze and identify potentially matching data (e.g., characters) preceding and following the default selection, whilst ignoring any special characters, until it encounters non-matching data (e.g., an unexpected/non-conforming character). In another example, step 270 may analyze and identify a predefined amount of data (e.g., number of characters) surrounding the default selection. Step 270 may then compare the identified data surrounding the default selection for a match to the expected data. However, in some scenarios, the user gesture or action may indicate an incorrect location in the second view. In this case step 270 may consider and analyze the code for displayed data anywhere in the second view for a match to the expected data for the input box, using any suitable technique.

Thus, step 270 performs a "smart selection" of data that matches the expected data for the input box, and, in particular, matches the expected data type and format of input data for the input box, and overrides the "default selection" of data with a refined selection, which is highlighted in the second view. The method may then wait for a copy command, for example by a user gesture or action on a copy icon, to copy the refined selection to a clipboard (not shown) or may automatically copy the selection (not shown). The method then proceeds to step 280.

At step 280, the method monitors for user navigation back to the input box in the first view and a paste command, for example by means of a predetermined paste gesture or action. In particular, step 280 uses the identifier for the input box, which was generated and saved in step 230, to determine whether the user has navigated back to the input box. Step 285 determines whether a paste command is detected in the input box. For example, a paste command may be detected from a user pointing gesture or action (e.g., a "tap" "touch and hold" gesture or "click" action) at a location within the input box, optionally followed by a paste gesture or action (e.g., a "touch" gesture or "click" action on a displayed paste icon). If step 285 does not detect a paste command, the method returns to step 280. If step 285 detects a paste command, the method proceeds to 290, which pastes the selected data into the input box in the first view. The method then ends at step 295.

In some example implementations, steps 240 and 245, comprising monitoring for a selection trigger and determining whether a selection trigger is detected, may be performed continuously or periodically, as long as the view containing the input box remains active (i.e., not closed by the user) or the expected data remains saved in memory (e.g., cache memory). In other example implementations, steps 240 and 245 may be performed for a predetermined time interval or number of views navigated by the user. Similarly, steps 280 and 285 of monitoring for navigation back to the input box in the first view and a paste command, may be performed continuously or periodically, or for a predetermined time interval or number of views navigated by the user. Implementation of monitoring for a selection trigger, copy command and paste command may be chosen according to vendor, application and/or user requirements, and may be chosen based on available processing, memory and power resources. Furthermore, some implementation may provide for user configuration of settings that control the monitoring for a selection trigger, copy command and paste command (e.g., by setting a time interval or otherwise).

In some implementations, step 290 of pasting the selected data in the input box may be performed automatically in response to the user navigation back to the first view. In this case, monitoring for a paste command is not required and step 285 may be omitted.

FIGS. 3A-E are screenshots showing illustrative views navigated by a user of a device comprising a touchscreen display in accordance with an example copy and paste operation using the method of FIG. 2.

Figures 3A, 3B, 3C, 3D, 3E:
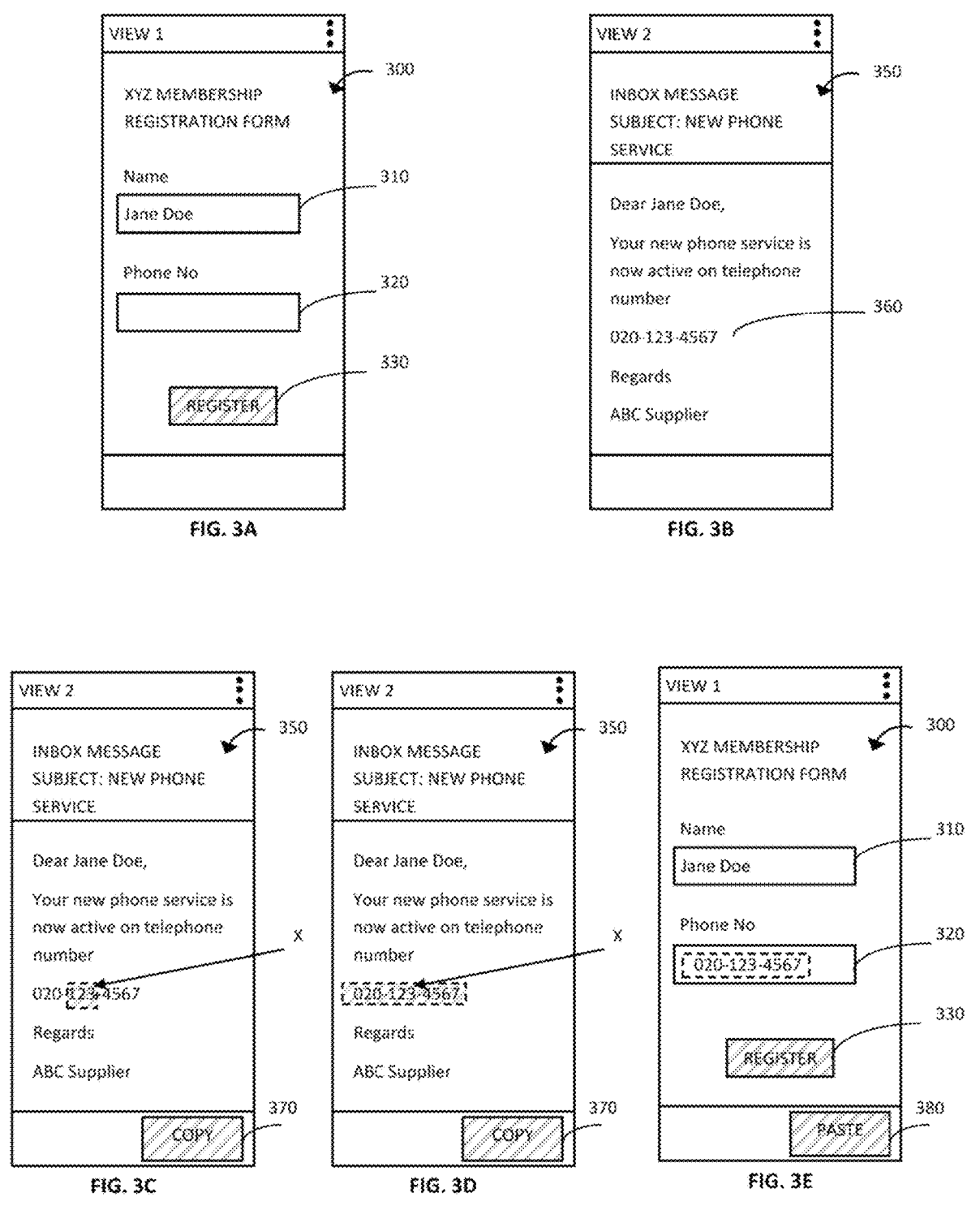

FIG. 3A shows a first view displayed to the user on a touchscreen display of the device. The first view (herein "view 1") comprises a registration form 300 entitled "XYX Membership Registration Form" for registering to use the user application "XYZ". In the illustrated example, the registration form 300 comprises an HTML form having a plurality of HTML form elements including a "Name" input element 310, a "Phone Number" input element 320 and a "Register" button element 230. In the view shown in FIG. 3A, "Name" input element 310 is an input box that has been populated with the user's name "Jane Doe". As the skilled person will appreciate, population of input element 310 may have been performed automatically, for example by an application or system function such as "autofill" and "autocomplete", or manually by the user. "Phone Number" input element 320 is an empty input box for the user to insert a valid telephone number. "Register" button element 330 is an element that allows the user to send the completed registration form to the XYZ application server. As described above, the user has the option to manually insert a phone number in input box 320 or to copy and paste the telephone number from another view. In a scenario of the illustrated example, the user has recently signed up to a new telephone service. Since it is newly assigned, the user cannot remember the new telephone number. However, the user remembers that the new telephone number is specified in an email message received from the service provider, which can be found in the inbox of the user's email application. Thus, the user decides to copy and paste the telephone number into the input box from the email message.

Accordingly, whilst the user is viewing "view 1" shown in FIG. 3A, the method 200 of FIG. 2 performs the following steps. Step 210 identifies that "view 1" has an input box for input data (i.e., input element 320), and step 220 determines that the user has interacted with the input box. Step 230 generates an identifier for the input box in the first view, identifies element data in the code associated with the input box (step 232), determines the expected data type and format of input data for the input box from the metadata (step 234), and stores the expected data type and format together with the identifier in cache memory (step 236). In the present example, the expected data type and format corresponds to a valid telephone number. Thus, the element data associated with the input box (as defined in the HTML code for input element 320) include the input field name (i.e., "Phone Number", which may also be the indicated in a "placeholder" attribute) and one or more attributes, parameters and values specifying the input data type and format (i.e., input type attributes such as "number" or "tel" (if supported)) and restrictions on the input data (i.e. size input attributes with max and min values) consistent with of a valid telephone number comprising 10 (ten) numerical characters. Step 240 then monitors subsequent user navigation of views for a "selection trigger" in a second view, as described below.

After viewing "view 1", the user launches the email application and navigates to a second view in the inbox of the email application. The second view displays the email message that includes the new telephone number "020-123-4567"). FIG. 3B shows the second view (herein "view 2") comprising an email message 350 with the telephone number 360 displayed on the touchscreen of the mobile device. Whilst viewing "view 2", the user performs a "selection trigger" gesture to initiate a selection of data for the copy and paste operation (e.g., a "tap and hold" of "touch" gesture) at a location X (see FIGS. 3C and 3D) on the touchscreen. Location X corresponds to the digit "3" in the telephone number "020-123-4567"). In response to the user's gesture at location X, step 245 detects a selection trigger, step 250 compares the default selection the location X with the expected data type and format of input data for the input box stored in cache memory in step 236, and step 255 determines whether the default selection matches the expected data type and format.

FIG. 3C shows "view 2", following the user's "selection trigger" gesture, displaying a "default selection" for a conventional copy function based on the location X. In particular, since the location X corresponds to the digit "3" in the telephone number "020-123-4567", the numeric character string "123" is selected by default, since the character string "123" corresponds to the group of characters that lies between the special characters "-" and includes the digit "3". Accordingly, since the expected data for the input box in the present example is for ten numeric characters corresponding to a valid telephone number, step 255 determines that the default selection does not match the expected data type and format. Thus, step 270 considers and analyzes the code surrounding the "default selection" for displayed data matching the expected data type and format. As described above, step 270 may analyze and identify potentially matching data (e.g., characters) preceding and following the default selection, whilst ignoring any special characters, until it encounters non-matching data (e.g., an unexpected/non-conforming character). In another example, step 270 may analyze and identify a predefined amount of data (e.g., number of characters) preceding and following the default selection. Step 270 may then compare the identified data surrounding the default selection for a match to the expected data. In the illustrated example, step 270 identifies the numeric character string "020" preceding the default selection "123" and the numeric character string "4567" following the default selection, and determines that the identified string of ten numeric characters "0201234567" matches the expected data type and format of input data for the input box. Thus, step 270 overrides the "default selection" with a "smart selection" of the identified string of numeric characters "0201234567" that matches the expected data type and format of input data for the input box.

FIG. 3D shows "view 2", following the user's selection trigger gesture, displaying the "smart selection" based on the location X, in accordance with the present disclosure. In the illustrated example, as well as displaying the "smart selection", the user is offered the option to copy the selected data by a copy icon 370, displayed in a bottom menu bar of "view 2". Thus, instead of having to use a selection refinement tool to adjust the "default selection" shown in FIG. 3C, the user is automatically presented with the "smart selection" shown in FIG. 3D. Accordingly, the user can immediately perform a copy gesture (e.g., a "touch" gesture on the copy icon 370) to copy the selection of the correct data, in this case the full telephone number, to a clipboard, before navigating back to the input box in "view 1" as shown in FIG. 3E. In particular, step 280 determines when the user navigates back to the input box in "view 1" and, in the present example, displays a paste icon 380 in the bottom menu bar, step 285 detects a paste gesture by the user (e.g., a "touch" gesture on the paste icon 380) and the copied telephone number is inserted or "pasted" into the input box 320 as shown by dashed outline in FIG. 3E.

Figure 4:
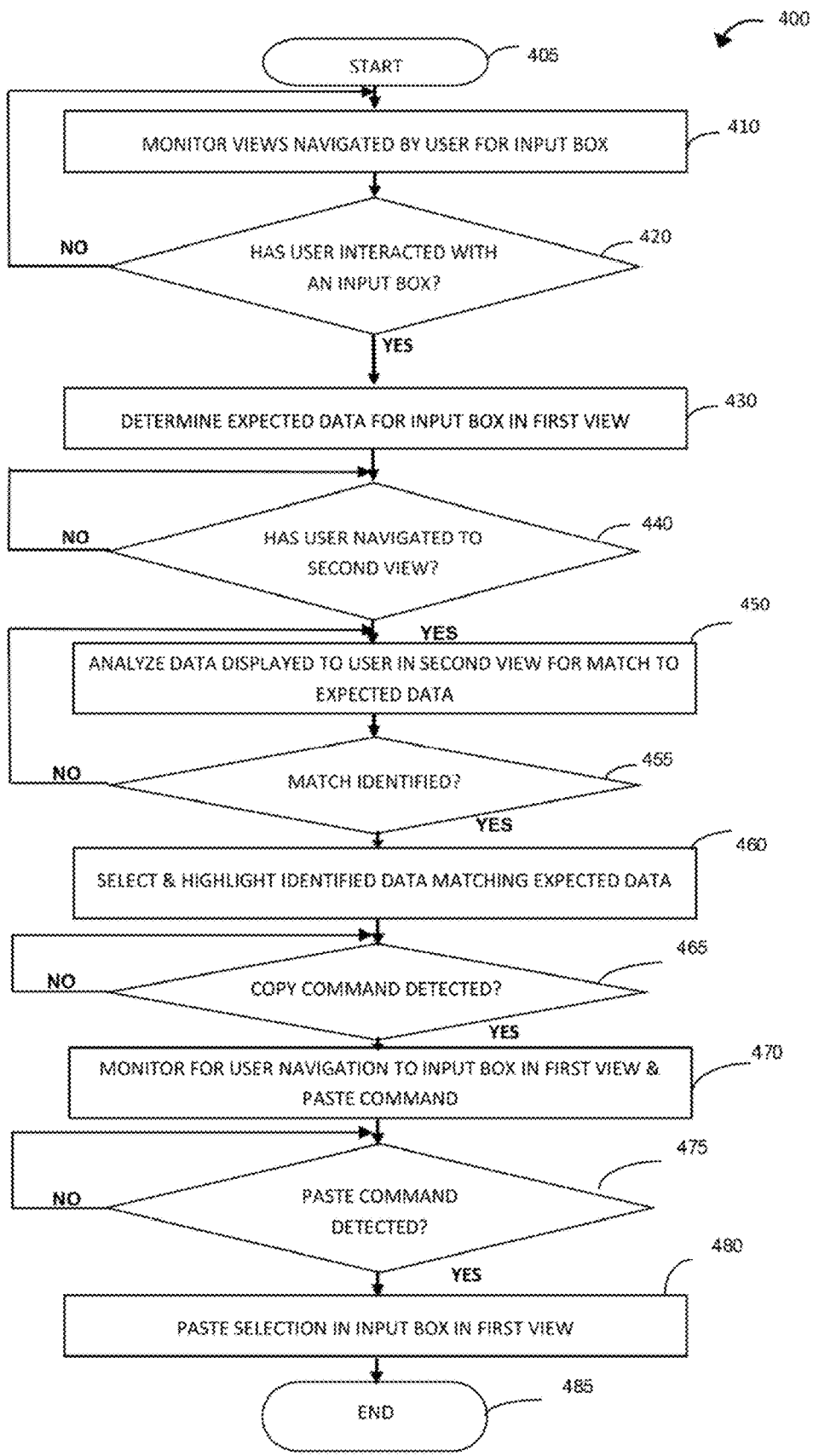
FIG. 4 is a flowchart of a method for a copy and paste operation in accordance with another example implementation of the present disclosure.

FIG. 4 is a flowchart of a method 400 in accordance with another example implementation of the present disclosure. The method 400 of FIG. 4 is a modification of the method 200 of FIG. 2. In particular, method 400 attempts to perform a "smart selection" from views navigated by a user after interacting with an input box without the user performing a selection trigger gesture to initiate a selection for a copy and paste operation.

The method 400 starts at step 405. For example, the method 400 may start when a user switches on a device or launches certain system or user applications.

At step 410, the method monitors views navigated by the user for an input box. In particular, step 410 examines the code associated with active views of system and user applications displayed to the user for an input box, such as an HTML form. In the illustrated example implementations, step 410 is performed continuously to locate input boxes, and thus concurrently with the subsequent steps of the method 400, as described below.

Step 420 determines whether the user has interacted with an input box in a displayed (herein "first") view. Step 420 may be performed periodically or in response to the identification of an input box at step 410. Step 420 may determine that the user has interacted with an input box in response to a user gesture (e.g., "tap" gesture) or equivalent user action (e.g., "hover" or "mouseover" action) associated with the input box. Alternatively, step 420 may infer that the user has interacted with an input box based on the amount of time that the input box is displayed to the user or otherwise, as described above in relation to step 220 of the method 200 of FIG. 2. If step 420 determines that the user has interacted with an input box, the method proceeds to step 430. Otherwise, the method returns to step 410.

Step 430 determines the expected data for the input box in the first view. In the method 400 of FIG. 4, step 430 comprises a series of sub-steps corresponding to steps 232 to 236 of step 230 of the method 200 of FIG. 2 shown in FIG. 2A as described above, which together determine and save information relating to the expected type and format of input data for the input box. As the skilled person will appreciate, other techniques for determining the expected data for the input box in step 430 are possible and contemplated by the present disclosure. The method then proceeds to step 440.

At step 440, the method considers whether the user has navigated to a second view. A second view may be defined as a subsequently displayed view that is potentially relevant for the copy and paste operation, which may be determined based on a number of factors. For example, a subsequent view may be considered to be potentially relevant if it is displayed to user within a predetermined amount of time or number of views navigated through since navigating away from the view containing the input box. As another example, a subsequent view may be considered to be potentially relevant if it is interacted with by the user, as described above. In particular, when wishing to complete an input box in a particular view, a user typically immediately starts to navigate to another known view containing the relevant data for copying and pasting into the input box. Such navigation may involve navigating to an already active view or may require launching an application and/or navigating through several views in an application, without significant interaction such as pausing, to locate the correct view. Thus, a subsequent view navigated to, and interacted with, by the user within an interval (e.g., time interval or number of navigated views) after navigating away from the view containing the input box is likely to be potentially relevant. In other examples, another view may be considered to be potentially relevant based on the type of view and/or user application and its relevance to the expected data type of input data from the input box. Other factors for determining whether another view is potentially relevant are possible and contemplated by the present disclosure. In some implementations, all subsequently displayed views navigated by the user may be considered to be a potentially relevant second view.

If step 440 determines that the user has navigated to a second view, the method proceeds to step 450. Otherwise, the method returns to step 440.

At step 450, the method analyzes data in the second view to identify data (e.g., text or other content) matching the expected data for the input box, as determined in step 430. In particular, data in the second view may be compared with the expected type and format of input data for the input box, as determined in step 234. For example, step 440 examines code (e.g., HTML code) of the second view, and compares the type and format of the displayed data with the expected data type and format of input data for the input box. Step 450 may be performed continuously, periodically or otherwise, as the user navigates the second view. Step 455 considers whether data matching the expected data type and format of input data for the input box is identified. If step 450 determines that a match is identified, the method proceeds to step 460. Otherwise, the method returns to step 450 and continues to analyze the second view, and/or subsequently displayed potentially relevant views, navigated by the user.

At step 460, the method selects the identified data from the second view that matches the expected data for the input box. In example implementations, the selection may be automatically displayed to the user, for example by highlighting the selected data in the displayed view. In the case that multiple matches are found in the second view, each of the selections may be uniquely highlighted (e.g., indexed by a letter, number or color code) as different selection options available for the user to choose to select for a copy and paste operation.

At step 465, the method considers whether a copy command is detected, for example by means of a copy gesture or action (e.g., a "touch" gesture of "click" action on a copy icon). In the case that multiple matches are found in the second view, a copy icon may be provided for each of the available selection options. If step 465 detects a copy command, the method copies the corresponding selection to a clipboard (not shown) and proceeds to step 470. Otherwise, the method returns to step 465.

At step 470, the method monitors for user navigation back to the input box in the first view and a paste command, for example by means of a predetermined paste gesture or action. In particular, step 470 uses the identifier for the input box, which was generated and saved in step 430, to determine whether the user has navigated back to the input box. Step 475 determines whether a paste command is detected in the input box. For example, a paste command may comprise a user gesture or action (e.g., a "tap" or "touch and hold" gesture or "click" action) at a location within the input box, optionally followed by a paste gesture or action (e.g., a "touch" gesture or "click" action on a displayed paste icon). If step 475 does not detect a paste command, the method returns to step 470. If step 475 detects a paste command, the method proceeds to 480, which pastes the selected data into the input box in the first view. The method then ends at step 485.

Figure 5A:
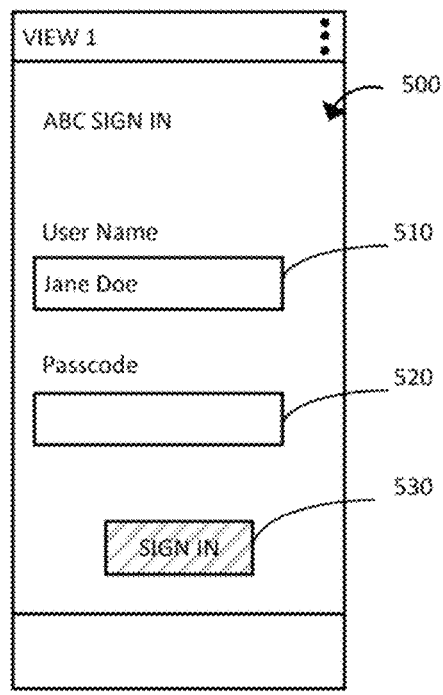
FIGS. 5A-5C are schematic screenshots showing an example copy and paste operation using the method of FIG. 4.
Figure 5B:
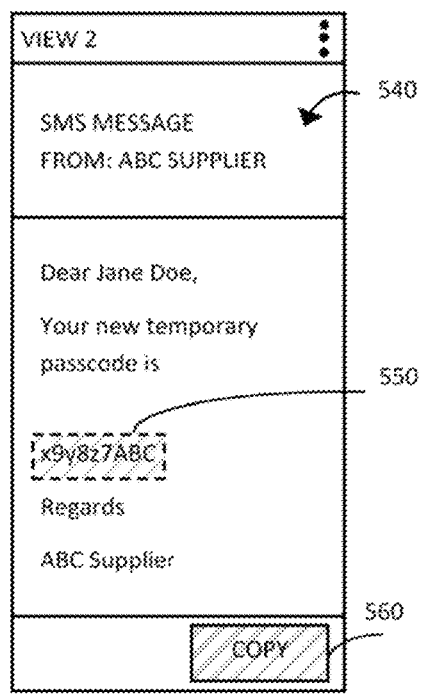
Figure 5C:
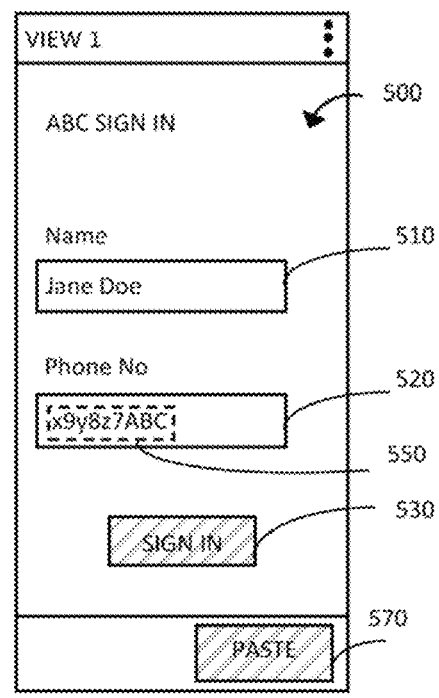

FIG. 5A-C are screenshots showing illustrative views navigated by a user of a device comprising a touchscreen display in accordance with an example copy and paste operation using the method of FIG. 4.

FIG. 5A shows a first view displayed to the user on a touchscreen of the device. The first view (herein "view 1") comprises a "sign in" form 500 entitled "ABC Sign In" for allowing a customer of ABC supplier to sign in to their online account using the user application "ABC". In the illustrated example, the sign in form 500 comprises an HTML form having a plurality of HTML form elements, including a "Name" input element 510, a "Passcode" input element 520 and a "Next" button element 530. In the view shown in FIG. 5A, "Name" input element 510 is an input box that has been populated with the user's name "Jane Doe". As the skilled person will appreciate, population of input element 510 may have been performed manually or automatically, as described above. "Passcode" input element 520 is an empty input box for the user to insert a valid passcode. "Sign in" button element 530 is an element that allows the user to send the completed registration form to the ABC application server. As described above, the user has the option to manually insert his or her passcode in input box 520 or to copy and paste the passcode from another view. In a scenario of the illustrated example, the user has forgotten his or her passcode and has requested a new temporary passcode to be sent by SMS message.

According, whilst the user is viewing "view 1" shown in FIG. 5A, the method 400 of FIG. 4 performs the following steps. Step 410 identifies that "view 1" has an input box for input data (i.e., input element 520), and step 420 determines that the user has interacted with the input box. Step 430 generates an identifier for the input box in the first view, identifies element data in the code associated with the input box (step 232), determines the expected data type and format of input data for the input box from the element data (step 234), and stores the expected data type and format together with the identifier for the input box in cache memory (step 236). In the present example, the expected data type and format may correspond to a valid passcode, which may between 8 and 12 characters long, include at least one number and at least one capital letter. Thus, the element data associated with the input box (as defined in the HTML code for input element 520) specify one or more attributes, parameters, values, requirements and restrictions for the type and format of a valid passcode, such as a restriction to the length range (e.g., defined by max and min size attributes) and so on.

After viewing "view 1", the user navigates to a second view of the relevant SMS message 540 in the SMS system application of the device as shown in FIG. 5B. The second view (herein "view 2") displays the SMS message 540 that includes the new temporary passcode 550 comprising the character string "x9y8z7ABC". Whilst viewing "view 2", step 440 of the method 400 determines that the user has navigated to a second view. Accordingly, step 450 analyzes the data displayed in the second view for data matching the expected data type and format of input data for the input box, step 455 identifies that the passcode 550 is a match and step 460 selects the character string "x9y8z7ABC". Notably, in this example, step 450 may identify data matching the expected data for the input box (i.e., input element 520) in the body of the SMS message 540 in "view 2" when it matches the length range and other attributes, parameters, values, requirements and restrictions of the input data for the input box. In addition, or alternatively, step 450 may identify the matching data based on the presence of the word "passcode" in the SMS message 540, which corresponds to the input label name attribute of input element 520. Step 460 highlights the identified selection as shown by the dashed outline in FIG. 5B. In addition, a copy icon 560 is displayed in the menu bar. Thus, whilst pausing at "view 2", the user is automatically presented with a "smart selection" corresponding to the required passcode, and can immediately perform a copy gesture (e.g., a "touch" gesture on the copy icon 560) to copy the selection of the correct data, in this case the passcode, to a clipboard.

Step 465 detects a copy command and step 470 monitors for user navigation back to the input box in "view 1" as shown in FIG. 5C. In particular, step 470 determines when the user navigates back to the input box in "view 1" and, in the present example, displays a paste icon 570 in the bottom menu bar, step 475 detects a paste command in response to a paste gesture by the user (e.g., a "touch" gesture on the paste icon 570) and the copied passcode is inserted or "pasted" into the input box 520 as shown by dashed outline in FIG. 5C.

Whilst FIGS. 3A-E and 5A-C illustrated screenshots of a mobile device comprising a touchscreen, such as a smart phone, the skilled person will appreciate that the principles of the present disclosure are applicable to all types of user devices that allow a user to perform a copy and paste operation. Nevertheless, the present disclosure is particularly beneficial when implemented in devices having small touchscreens, since the selection refinement tools associated with such devices are time consuming and awkward to use, as described above.

Figure 6:
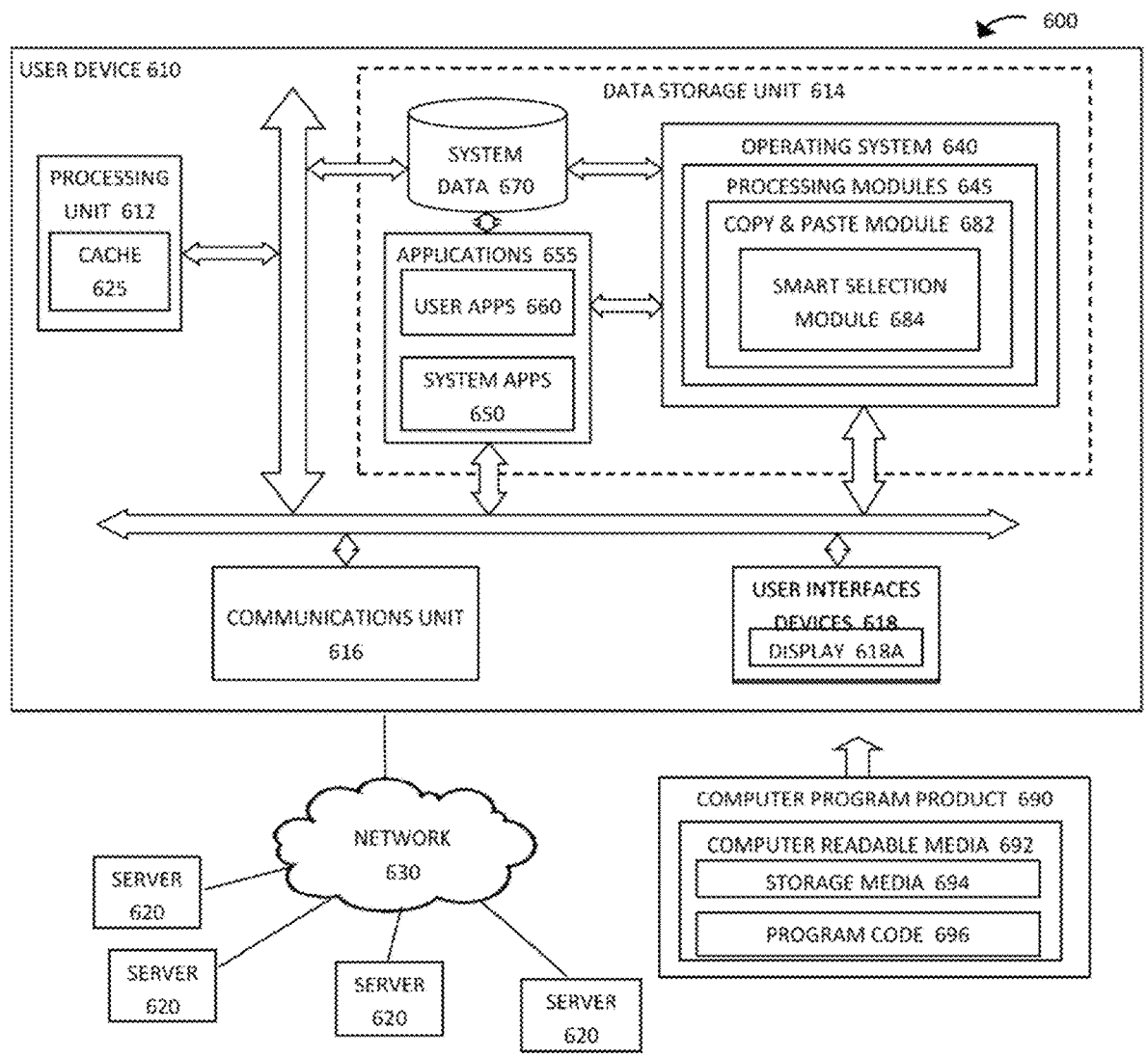
FIG. 6 is a block diagram of a system including a device in accordance with example implementations of the present disclosure.

FIG. 6 is a block diagram of a system 600 in accordance with example implementations of the present disclosure. In particular, the system 600 comprises a user device 610, such as a smart phone, tablet or similar portable computing device. Alternatively, device 610 may be a desktop computer or similar non-portable computing device.

User device 610 comprises processing unit 612, data storage unit 614, communications unit 616 and user interface devices 618. User interface devices 618 include a display 618A such as a touchscreen. User interface devices 618 may also include one or more other user input devices such as a mouse, touchpad and microphone. Other features of mobile device 610, such as a power source, camera, accelerometer, are omitted for ease of understanding of the present disclosure.

Communications unit 616 is configured for connection to a network 630, as described herein, for exchanging messages with servers 620 (e.g., app servers, web servers, SMS and email servers). Network 630 may comprise any suitable wired or wireless data communications network, such as a local area network (LAN), wide area network (WAN) or the Internet. In some example implementations, communications unit 616 is configured for connection to more than one network.

Data storage unit 614 stores instructions executable by processing unit 612 for operating the mobile device 610. In particular, data storage unit 614 includes an operating system (OS) 640, and applications 655 including system applications 650 and user applications 660. As the skilled person will understand, operating system 640 controls and manages the operations of the system applications 650 and user applications 660. Operating system 640 includes processing modules 645 for performing common processes and functions for multiple system applications 650 and/or user applications 660. In addition, data storage unit 614 stores system data 470, which, in some example implementations, takes the form of a database. System data 670 comprises input data received from a user via user interface devices 618 and data and received from one or more servers 620 via network 630 and communications unit 616. Systems data 670 may be loaded into a cache memory 675 associated with processing unit 612 when executing instructions for operating the user device 610.

Processing modules 645 include user tools for providing user functions common to multiple applications 655. In particular, processing modules 645 include a copy and paste module 682 for enabling a user to perform improved copy and paste operations as described herein. In particular, in example implementations, copy and paste module 682 comprises instructions for performing the method 200 of FIG. 2 and/or the method 400 of FIG. 4. Copy and paste module 682 includes a smart selection module 684 for performing a "smart selection" of data for a copy and paste operation, as described herein. In particular, smart selection module 682 selects, from a second view on display 618A, data corresponding to an expected data type and format of input data for an input box in a first view previously displayed on display 618A. Smart selection module 684 uses information relating to the expected input data for the input box previously determined and stored in cache memory 675, as described herein.

With continuing reference to FIG. 6, a computer program product 690 is provided. The computer program product 690 includes computer readable media 692 having storage media 694 and program instructions 696 (i.e., program code) embodied therewith. The program instructions 496 are configured to be loaded onto data storage unit 614 of mobile device 610, for example as a processing module 645 or application 655 (or part thereof) using one of user interface devices 618 or a device connected to network 630 via communications unit 616. In example implementations, program instructions 696 are configured as copy and paste module 682 and/or smart selection module 684 to perform one of more of the methods disclosed herein, such as the method 200 of FIG. 2 and/or the method 400 of FIG. 4.

Whilst the present disclosure has been described and illustrated with reference to example implementations, the skilled person will appreciate that the present disclosure lends itself to many different variations and modifications not specifically illustrated herein.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of a computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is a service oriented with a focus on statelessness, low coupling, modularity, and semantic interoperability. At the heart of cloud computing is an infrastructure comprising a network of interconnected nodes.

Figure 7:
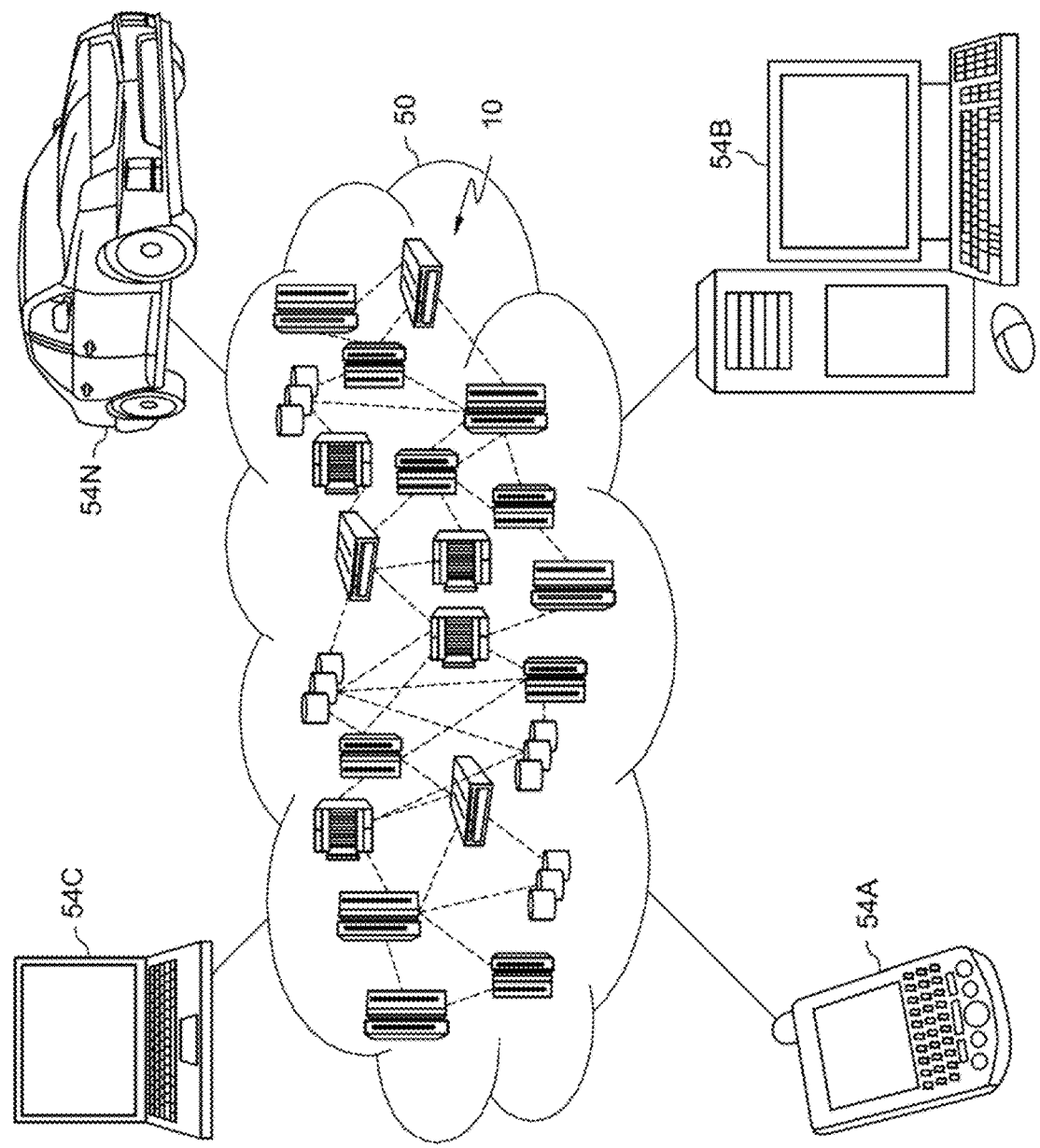
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 8:
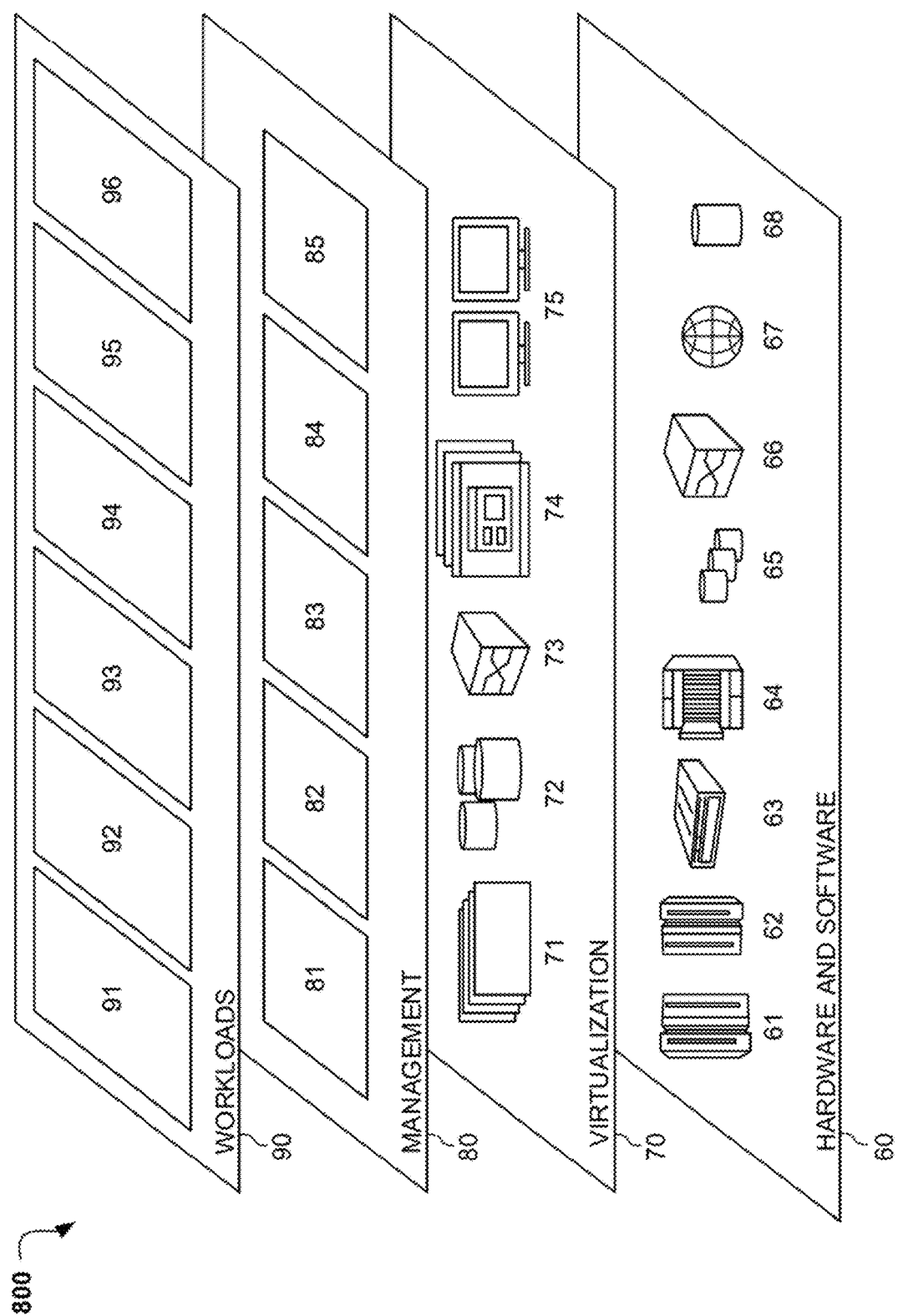
FIG. 8 depicts abstraction model layers according to an embodiment of the present invention.

Referring now to FIG. 8, a set of functional abstraction layers 800 provided by cloud computing environment 50 is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfilment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and improvement in copy and paste operations processing 96. Improvement in copy and paste operations processing 96 may relate to monitoring and detecting an input box to receive input data of an expected data type and format.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. A method comprising:
monitoring, on a display of a device, user navigation of views to detect an input box to receive input data of an expected data type and format;
determining whether the user has interacted with the detected input box based on an amount of time that the input box is displayed at a center of a view when the user pauses for a preconfigured amount of time without scrolling past the input box;
in response to detecting an input box displayed in a first view, determining the expected data type and format of input data for the input box;
analyzing data displayed in a second view, to identify data matching the expected data type and format of input data for the input box in the first view, wherein the second view is displayed subsequent to the first view, wherein analyzing the data displayed in a second view is triggered by a predefined user gesture that comprises a touch and hold gesture and a tap gesture on the touch screen, and
in response to identifying data in the second view matching the expected data type and format of input data for the input box in the first view, automatically selecting the identified data for copying from the second view to the input box in the first view as part of a copy and paste operation of the device.

2. The method of claim 1, wherein determining the expected data type and format of input data for the input box comprises analyzing the code associated with the input box in the first view to identify element data for the input data.

3. The method of claim 2, wherein the element data comprises one or more predefined attributes, parameters, values, requirements and restrictions for the input data.

4. The method of claim 1, further comprising:
generating an identifier for the input box, and
storing the identifier together with the expected type and format of input data for the input box in cache memory.

5. The method of claim 1, wherein, in response to determining the expected data type and format of input data for the input box, the method further comprises:
detecting user input for initiating a selection function for selecting data for the copy and paste operation, the user input indicating a location in the second view,
wherein analyzing displayed data in the second view, to identify data matching the expected data type and format of input data for the input box, is performed in response to detecting the user input for initiating the selection function of the device.

6. The method of claim 5, wherein analyzing displayed data in the second view to identify data matching the expected data type and format of input data for the input box comprises:
comparing default data selected by the selection function based on the indicated location in the second view with the expected data type and format of input data for the input box of the first view, wherein each of the element data attribute, values, parameters and restrictions for the default data is compared.

7. The method of claim 6, wherein, if the default data selected by the selection function based on the indicated location in the second view does not match the expected data type and format of input data for the input box of the first view, the method further comprises:
analyzing data displayed in the second view in the vicinity of the location of the default data selected by the selection function to identify data matching the expected data type and format of input data for the input box in the first view, wherein analyzing data displayed in the second view in the vicinity of the location includes identifying matching characters preceding and following the selection and identifying a predefined amount of data surrounding the selection, and
if data matching the expected data type and format is identified, automatically selecting the identified data instead of the default data for copying from the second view to the input box in the first view as part of the copy and paste operation of the device.

8. The method of claim 1, wherein automatically selecting the identified data comprises:
highlighting the selected data in the second view on the display of the device, the method further comprising:
monitoring user navigation back to the input box in first view, and
in response to user navigation back to the input box in the first view, determining whether a paste command is detected to paste the highlighted data into the input box of the first view.

9. The method of claim 1, wherein analyzing displayed data in the second view, to identify data matching the expected data type and format of input data for the input box, is performed in response to the user navigating to the second view within a predefined interval after the navigating away from the first view.

10. A device, comprising a processor, data storage and a display, wherein the processor is configured to:
   monitor, on the display of the device, user navigation of views to detect an input box to receive input data of an expected data type and format;
   determine whether the user has interacted with the detected input box based on an amount of time that the input box is displayed at a center of a view when the user pauses for a preconfigured amount of time without scrolling past the input box;
   in response to detecting an input box displayed in a first view, determine the expected data type and format of input data for the input box;
   analyze data displayed in a second view, to identify data matching the expected data type and format of input data for the input box in the first view, wherein the second view is displayed subsequent to the first view wherein analyzing the data displayed in a second view is triggered by a predefined user gesture that comprises a touch and hold gesture and a tap gesture on the touch screen, and
   in response to identifying data in the second view matching the expected data type and format of input data for the input box in the first view, automatically select the identified data for copying from the second view to the input box in the first view as part of a copy and paste operation of the device.

11. The device of claim 10, wherein the processor is configured to determine the expected data type and format of input data for the input box by analyzing the code associated with the input box in the first view to identify element data for the input data.

12. The device of claim 11, wherein the element data comprises one or more predefined attributes, parameters, values, requirements and restrictions for the input data.

13. The device of claim 10, wherein the processor is further configured to:
   generate an identifier for the input box, and
   store the identifier together with the expected type and format of input data for the input box in cache memory.

14. The device of claim 10, wherein, in response to determining the expected data type and format of input data for the input box, the processor is further configured to:
   detect user input for initiating a selection function for selecting data for the copy and paste operation, the user input indicating a location in the second view,
   wherein the processor is configured to analyze displayed data in the second view, to identify data matching the expected data type and format of input data for the input box, in response to detecting the user input for initiating the selection function of the device.

15. The device of claim 14, wherein the processor is configured to analyze displayed data in the second view, to identify data matching the expected data type and format of input data for the input box, by comparing default data selected by the selection function based on the indicated location in the second view with the expected data type and format of input data for the input box of the first view.

16. The device of claim 15, wherein, if the default data selected by the selection function based on the indicated location in the second view does not match the expected data type and format of input data for the input box of the first view, the processor is further configured to:
   analyze data displayed in the second view in the vicinity of the location of the default data selected by the copy function to identify data matching the expected data type and format of input data for the input box in the first view, wherein analyzing data displayed in the second view in the vicinity of the location includes identifying matching characters preceding and following the selection and identifying a predefined amount of data surrounding the selection, and
   if data matching the expected data type and format is identified, automatically select the identified data instead of the default data for copying from the second view to the input box in the first view as part of the copy and paste operation of the device.

17. The device of claim 10, wherein the processor is configured to automatically select the identified data by highlighting the selected data in the second view on the display of the device, wherein the processor is further configured to:
   monitor user navigation back to the input box in first view, and
   in response to user navigation back to the input box in the first view, determining whether a paste command is detected to paste the highlighted data into the input box of the first view.

18. The device of claim 10, wherein the processor is configured to analyze displayed data in the second view, to identify data matching the expected data type and format of input data for the input box, in response to the user navigating to the second view within a predefined interval after the navigating away from the first view.

19. A computer program product comprising a computer readable storage medium having program instructions embodied therewith, wherein the program instructions are executable by a processor to cause the processor to:
   monitor, on a display of a device, user navigation of views to detect an input box to receive input data of an expected data type and format;
   determine whether the user has interacted with the detected input box based on an amount of time that the input box is displayed at a center of a view when the user pauses for a preconfigured amount of time without scrolling past the input box;
   in response to detecting an input box displayed in a first view, determine the expected data type and format of input data for the input box;
   analyze data displayed in a second view, to identify data matching the expected data type and format of input data for the input box in the first view, wherein the second view is displayed subsequent to the first view, and
   in response to identifying data in the second view matching the expected data type and format of input data for the input box in the first view, automatically select the identified data for copying from the second view to the input box in the first view as part of a copy and paste operation of the device.

20. The computer program product of claim 19, wherein the program instructions are further configured to:
   generate an identifier for the input box, and
   store the identifier together with the expected type and format of input data for the input box in cache memory.

* * * * *